United States Patent [19]

Matumoto et al.

[11] Patent Number: 5,777,958
[45] Date of Patent: Jul. 7, 1998

[54] DOOR STRUCTURE FOR A RECORDING MEDIUM REPRODUCING DEVICE

[75] Inventors: Sigeru Matumoto; Yuhshi Kako, both of Saitama-ken, Japan

[73] Assignee: Pioneer Electronic Corporation, Tokyo, Japan

[21] Appl. No.: 708,949

[22] Filed: Sep. 6, 1996

[30] Foreign Application Priority Data

Sep. 11, 1995 [JP] Japan .................................. 7-233031

[51] Int. Cl.⁶ .............................. G11B 17/26; G11B 33/12
[52] U.S. Cl. .................................. 369/37; 369/75.1
[58] Field of Search ........................... 369/37, 36, 75.1,
369/178, 191, 192; 360/92, 98.04, 98.05,
98.06; 312/9.31, 9.45, 9.46; 206/307, 307.1,
308.1

[56] References Cited

U.S. PATENT DOCUMENTS

| | | | |
|---|---|---|---|
| 3,862,787 | 1/1975 | Hilsinger | 312/9.46 |
| 4,826,261 | 5/1989 | Nademlejnsky | 312/9.46 |
| 5,020,043 | 5/1991 | Kohler | 369/36 |
| 5,511,871 | 4/1996 | Dalziel | 360/92 |
| 5,644,558 | 7/1997 | Inatani et al. | 369/37 |

*Primary Examiner*—Craig A. Renner
*Attorney, Agent, or Firm*—Nikaido, Marmelstein, Murray & Oram LLP

[57] ABSTRACT

A recording medium reproducing device includes a casing, a reproducing section provided within the casing, a recording medium changer provided adjacent to the reproducing section within the casing and a door provided at an opening of the recording medium changer. The recording medium changer has a receiving section rotatable about a center shaft and adapted to receive a number of recording media. The opening enabling a recording medium to be put into or taken out from the receiving section. The door being constructed such that when the door is opened or closed, the door turns about an axis which is coaxial with the center shaft of the receiving section.

8 Claims, 8 Drawing Sheets

PRIOR ART

FIG.8

PRIOR ART

FIG.9

PRIOR ART

DOOR STRUCTURE FOR A RECORDING MEDIUM REPRODUCING DEVICE

BACKGROUND OF THE INVENTION

The present invention relates to a recording medium reproducing device such as a CD (compact disc) reproducing device.

There have been known several types of CD reproducing devices each having a disc changer including a disc rack capable of receiving a number of CDs.

Figure 7:
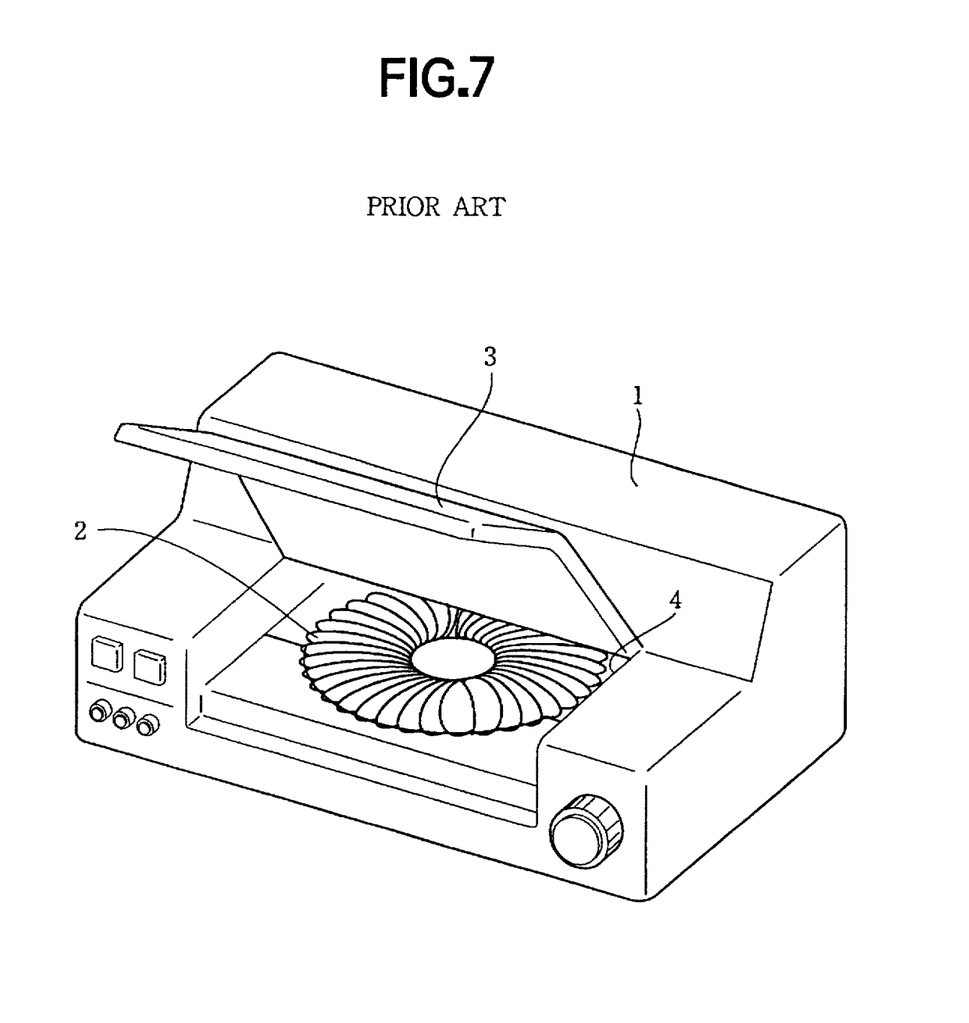
FIG. 7 is a perspective view showing a conventional recording medium reproducing device.

FIG. 7 diagrammatically illustrates a conventional CD reproducing device having a reproducing section installed in its main body 1. This reproducing device has a CD changer including a door 3 which is adapted to pivot upwardly when the door is opened. After the door 3 is opened, a number of CDs 2 may be put into or removed from a disc rack (not shown) provided within the CD changer, by way of an opening 4.

Figure 8:
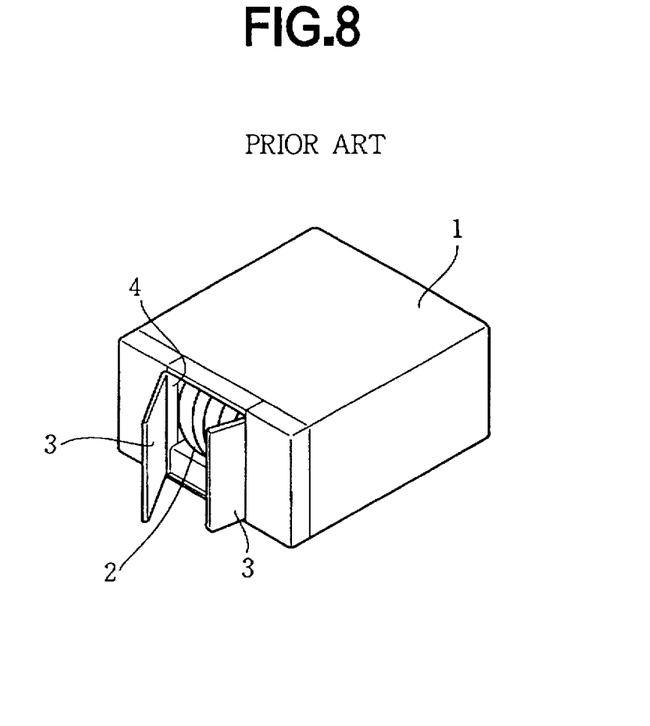
FIG. 8 is a perspective view showing another conventional recording medium reproducing device.
Figure 9:
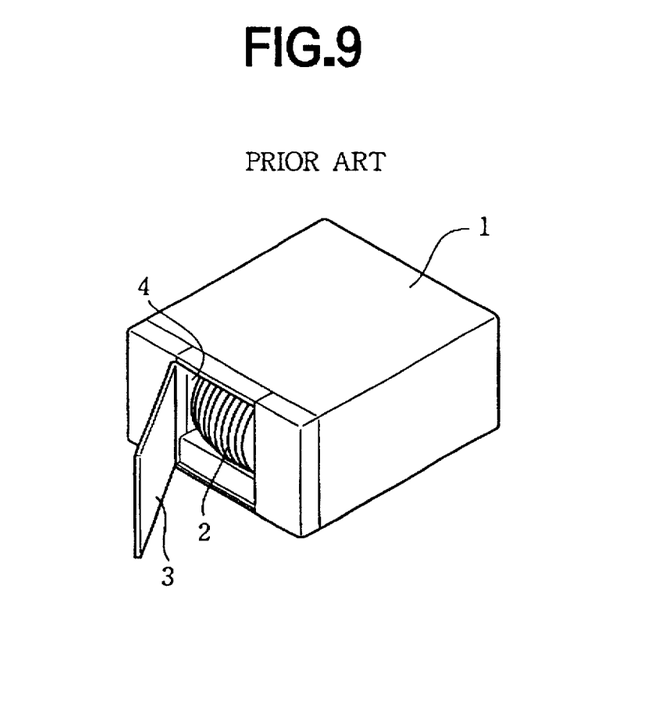
FIG. 9 is a perspective view showing a further conventional recording medium reproducing device.

FIGS. 8 and 9 diagrammatically illustrate another two types of conventional CD reproducing devices having reproducing sections installed in their main bodies 1.

The CD reproducing device shown in FIG. 8 has a CD changer including a pair of doors 3 which are needed to pivot forwardly when the doors are to be opened. After the doors 3 are opened, a number of CDs 2 may be received into or removed from a disc rack (not shown) provided within the CD changer, by way of an opening 4.

The CD reproducing device shown in FIG. 9 has a CD changer including only one door 3. But, this door is also needed to pivot forwardly when it is to be opened. After the door 3 is opened, a number of CDs, 2 may be received into or 5 removed from a disc rack (not shown) provided within the CD changer, by way of an opening 4.

However, with the CD reproducing device of FIG. 7, since it is required to have a necessary space overhead for the door 3 to be opened upwardly, it is not allowed to place other things over the device. As a result, it is difficult to make full use of a space around a CD reproducing device.

Further, with the CD reproducing devices of FIGS. 7 and 8, a pair of doors 3 or a single door 3, when in their opened positions, will sometimes be in a fluttering condition, hence impeding or even wounding a disc being put into or taken from a disc rack. Moreover, when the door(s) 3 is opened and there is no disc remaining inside a disc rack, it is liable that a person will accidentally put his hand into the CD changer, thus unintentionally damaging various elements installed therein.

SUMMARY OF THE INVENTION

The object of the present invention is to provide a recording medium reproducing device having an improved recording medium changer, so as to solve the above-mentioned problems peculiar to the above-mentioned prior arts.

According to the present invention, there is provided a recording medium reproducing device which comprises a casing, a reproducing section provided within the casing, a recording medium changer provided adjacent to the reproducing section within the casing. The recording medium changer has (1) a receiving section adapted to receive a number of recording media, (2) a door provided at an opening of the recording medium changer for a recording medium to be put into or taken out from the receiving section, the door being constructed such that when the door is opened or closed the door itself turns about a shaft coaxial with a center shaft of the receiving section.

In one aspect of the present invention, the above door is provided such that when the door is opened, the door itself will be in a position between the opening of the recording medium changer and internal elements provided within the recording medium changer.

In another aspect of the present invention, the above door is of a generally fan-shaped form, covering a part of the receiving section. When the door is being opened or closed, the door itself turns about its shaft with its outer periphery moves along an arc trace which is almost coincident with the outer periphery of the receiving section.

In a further aspect of the present invention, a detector is provided at a terminal position in the opening direction of the door, to detect whether the door has been completely opened. Another detector is provided at a terminal position in the closing direction of the door, to detect whether the door has been completely closed.

In a still further aspect of the present invention, the above receiving section is provided to be freely rotatable for 360° and to be fixable by a locking mechanism.

The above objects and features of the present invention will become more understood from the following description with reference to the accompanying drawings.

DETAILED DESCRIPTION OF THE PREFERRED EMBODIMENTS

Figure 3:
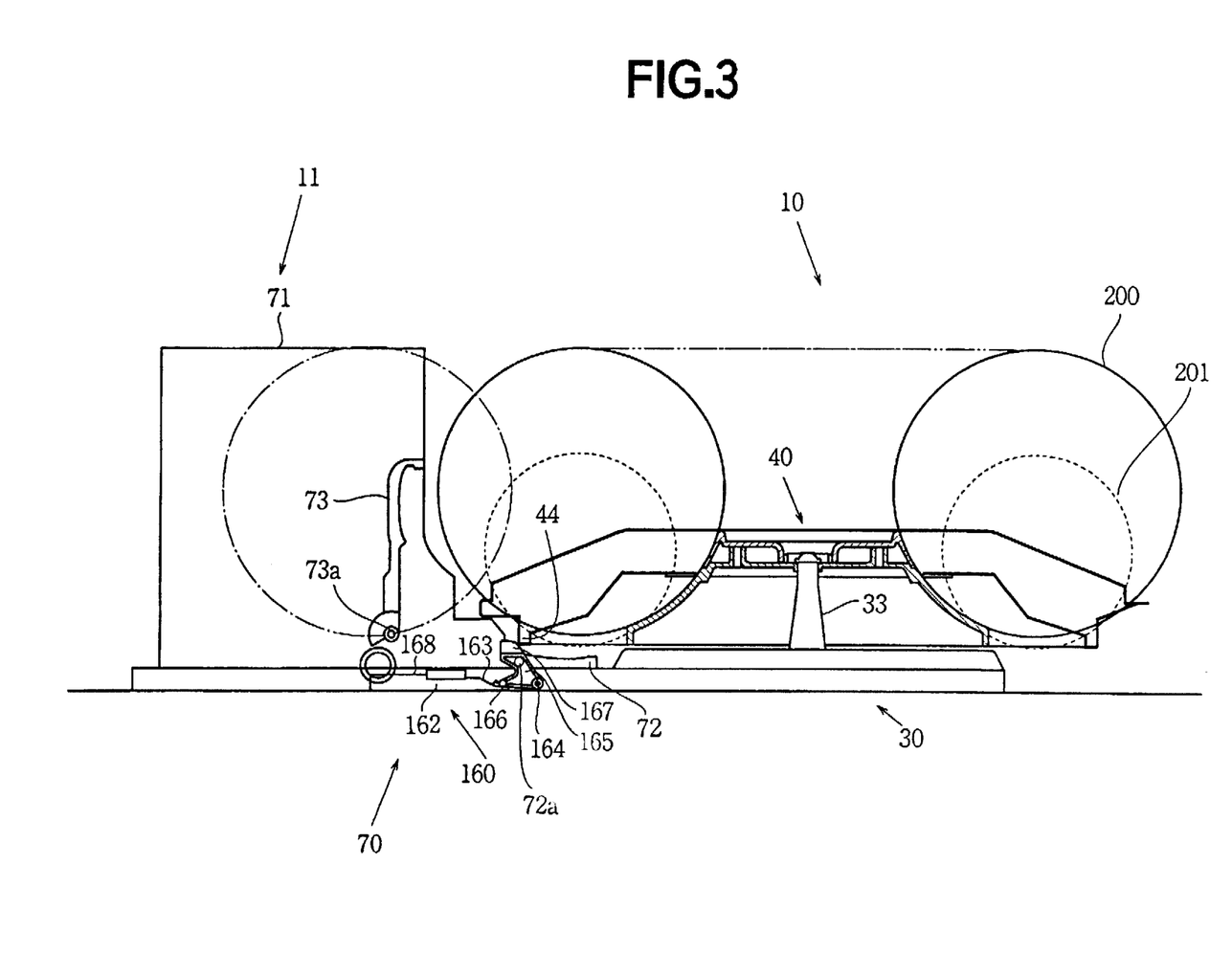
FIG. 3 is a side elevation showing the recording medium reproducing device of the present invention.

Referring to FIG. 3, a recording medium (CD) reproducing device according to the present invention has a reproducing section 11 and a recording medium (CD) changer 10.

Figure 1:
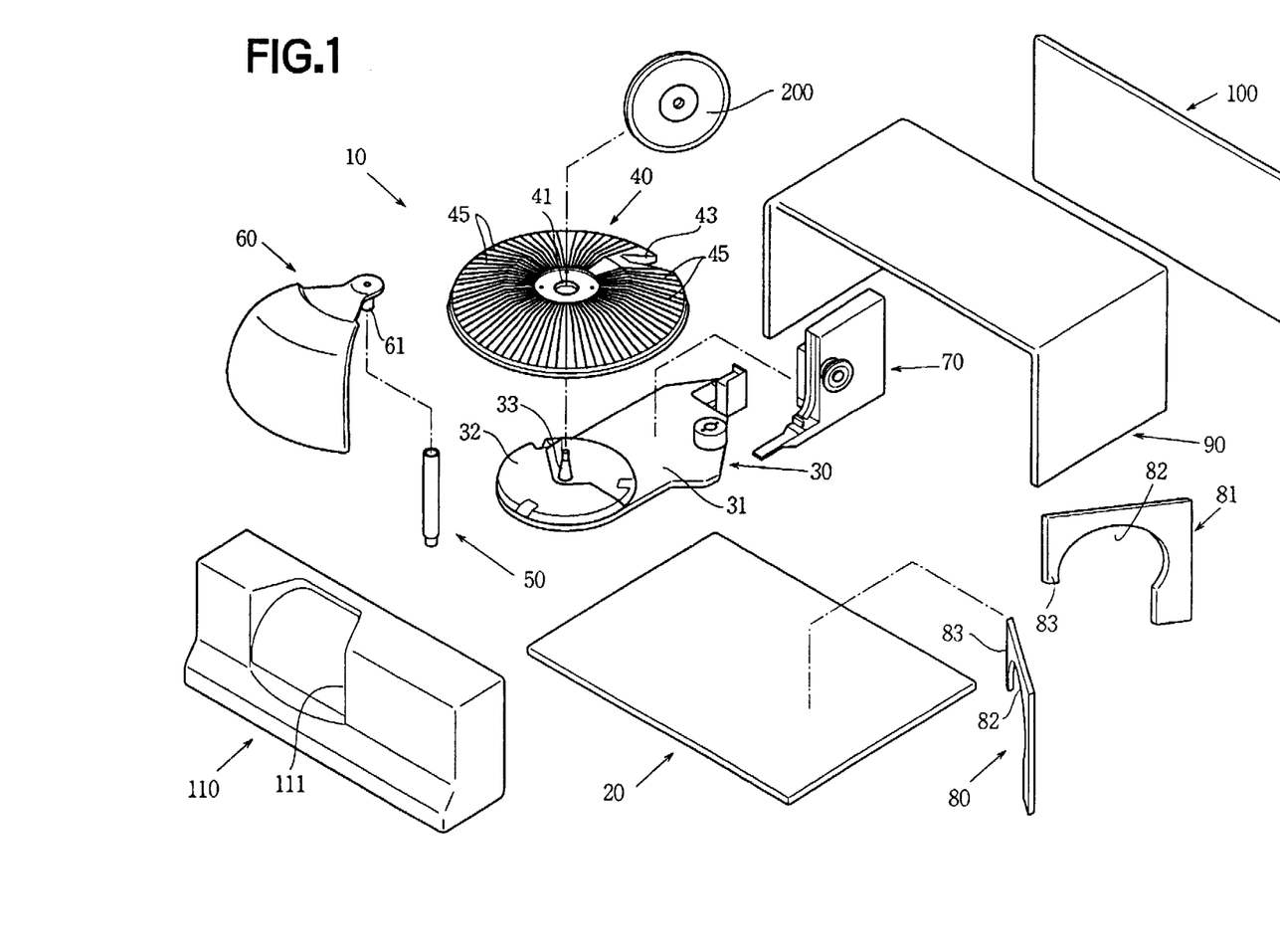
FIG. 1 is an exploded view showing a recording medium reproducing device employing an improved recording medium changer according to the present invention.

Referring to FIG. 1, the CD changer 10 has a roulette unit 30 provided on a chassis base 20. The roulette unit 30 has a base plate 31 and a support plate 32. A shaft 33 is vertically secured on the support plate 32. A disc rack 40 is provided having a center hole 41 into which the shaft 33 may be inserted. The disc rack 40 has a disc receiving section 45 including many slits into which a number of CDs 200 (size: 12 cm) or CDs 201 (size: 8 cm, see FIG. 3) may be vertically inserted so as to be held there.

A generally fan-shaped door 60 having a rotating shaft 61 is supported through a center post 50 on the shaft 33. The center post 50 is in tight contact with front end portions 83 of two fence members 80 and 81, so that a possible vibration of the center post 50 may be prohibited or at least alleviated.

Figure 2:
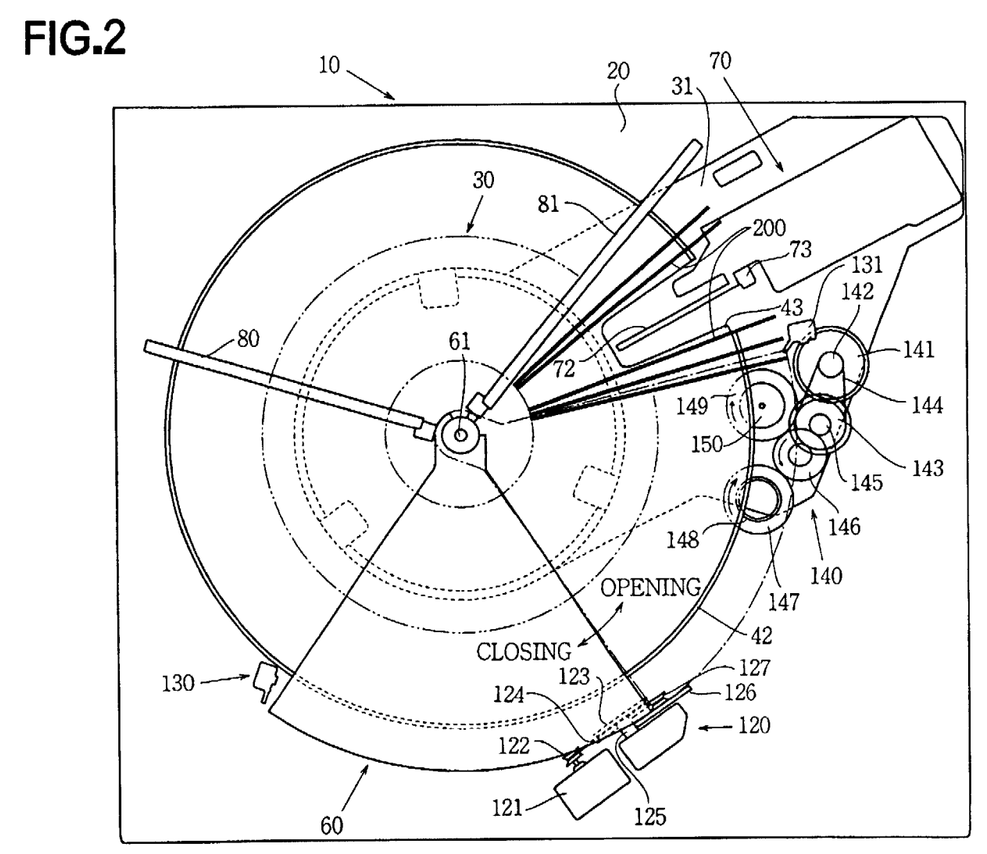
FIG. 2 is a plane view showing the improved recording medium changer of FIG. 1.

Referring to FIG. 2, the fan-shaped door 60 supported by the center post 50 may be turned in both the clockwise and counterclockwise directions. When an operating panel 110 (FIG. 1) having an opening 111 is in an opened position, the door 60 can be moved to a position between the opening 111 and a disc rack driving system 140, so that the disc rack driving system 140 may be protected from any possible touching which is unintentional but harmful to the machine.

As shown in FIGS. 1 and 2, a loading device 70 is provided on the base plate 31 of the roulette unit 30. Referring to FIG. 3, the loading device 70 has an arm member 72 and another arm member 73, both of which are provided in order to move a CD 200 or a CD 201 from the disc rack 40 into the reproducing section 11, and vice versa.

Referring to FIG. 1, each of the fence members 80 and 81 is formed with a notch 82, so that when the disc rack 40 rotates, comparatively larger discs CD 200 (size:12 cm) held by the disc rack 40 will not bump against these fence members.

Further provided on the chassis base 20 is an inverted U-shaped cover 90, a back plate 100 is attached with the cover 90 on the back side thereof, and the operating panel 110 having an opening 111 is provided in the front of the cover 90. In this way, a casing for the CD reproducing device is formed.

Referring to FIG. 2, the fan-shaped door 60 is driven by a drive system 120 which includes a motor 121 having a pulley 122. A belt 124 is engaging around the pulley 122 and a gear pulley 123, so that a driving force may be transmitted from the pulley 122 to the gear pulley 123.

As illustrated in FIG. 2, engaged with a gear portion 125 of the gear pulley 123 is a two-stage gear 126 which is provided to rotate another two-stage gear 127. With the rotation of the gear 127, a gear rack (not shown) formed along the lower portion of the door 60 is moved, so that the door 60 may be turned about the center post 50 by about 65° to open or close the CD changer 10, then the door 60 is turned about the center post 50 in its opening direction and is stopped in a position near the rack driving system 140, the rack driving system 140 will be guarded from any possible touching by a hand through the opening 111 of the operating panel 110 (FIG. 1).

Referring again to FIG. 2, a detecting switch 130 is provided at a terminal position in the closing direction of the door 60, the closing movement, of the door 60 will turn on the switch 130 which will give a signal that the door 60 has been closed. On the other hand, a detecting switch 131 is provided at a terminal position in the opening direction of the door 60, the opening movement of the door 60 will turn on the switch 131 which will give a signal that the door 60 has been opened.

The disc rack driving system 140 for driving the disc rack 40 is provided on the base plate 31 of the roulette unit 30. Such driving system 140 includes a motor 141 having a pulley 142. A belt 144 is engaging around the pulley 142 and a gear pulley 143, so that a driving force may be transmitted from the motor 141 to the gear pulley 143. The driving force is further transmitted to an intermediate gear 146 which is engaged with a small gear 145 secured coaxially with the gear 143.

The driving force is then transmitted from the intermediate gear 146 to a pair of twin gears 147 and 149 each having a transmitting gear 148 or 150. Through the engagement of the transmitting gears 148 and 150 with the gear portion 42 formed along the outer periphery of the disc rack 40, the driving force will cause the disc rack 40 to rotate in the clockwise or counterclockwise direction.

The twin gears 147 and 149 are provided so that when one gear 147 or 149 encounters a notch portion 43 formed on the disc rack 40, another gear 147 or 149 will still keep its engagement with the gear portion 42 of the disc rack 40, thus ensuring a constant driving force being applied to the disc rack 40.

Here, as illustrated in FIG. 2, the notch portion 43 of the disc rack 40 is normally aligned with the loading device 70 as its home position.

The loading device 70 will be described in more detail with reference to FIG. 3.

Referring to FIG. 3, the loading device 70 has an arm 72 pivotable about a shaft 72a and an arm 73 pivotable about a shaft 73a. Then a CD 200 or a CD 201 is to be loaded into its reproduction position, the arm 73 in vertical state is caused to pivot in the clockwise direction until it engages with the out periphery of the CD 200 or the CD 201. Since the CD 200 and the CD 201 are different from each other in size, the quantity of pivoting movement of the arm 73 will also be different with CDs of different size. The quantity of pivoting movement of the arm 73 may be detected by a detecting means (not shown) which can in turn tell the size of a CD in accordance with the quantity of the pivoting movement.

After the arm 73 has engaged with the out periphery of the CD 200 or the CD 201, the arm 72 in horizontal state is caused to pivot in the counterclockwise direction unit it engages with the outer periphery of the CD 200 or the CD 201.

With its outer periphery being clamped by two arms 72 and 73, the CD 200 or the CD 201 is moved into a loading device main body 71 (disposed within the reproducing section 11) by counterclockwise pivoting movement of the arms. Then, the CD 200 or the CD 201 is mounted on a turn table inside the main body 71 so as to be under a reproduceable condition. Subsequently, the arms 72 and 73 are caused to move away a little from the CD 200 or the Cl) 201 so as not to impede the rotation of the disc.

On the other hand, when a CD 200 or the CD 201 is to be ejected from the loading device main body 71, the CD is clamped by the two arms 72 and 73. Then, in a process opposite to that described above, the CD 200 or the CD 201 is moved back to the receiving section 45 of the disc rack 40.

Further, a locking mechanism 160 is provided on the bottom of the loading device main body 71. With the use of the locking mechanism 160, while a CD is being taken from the disc rack 40 an unwanted rotation (in horizontal plane) of the disc rack 40 may be prevented.

Figure 4:
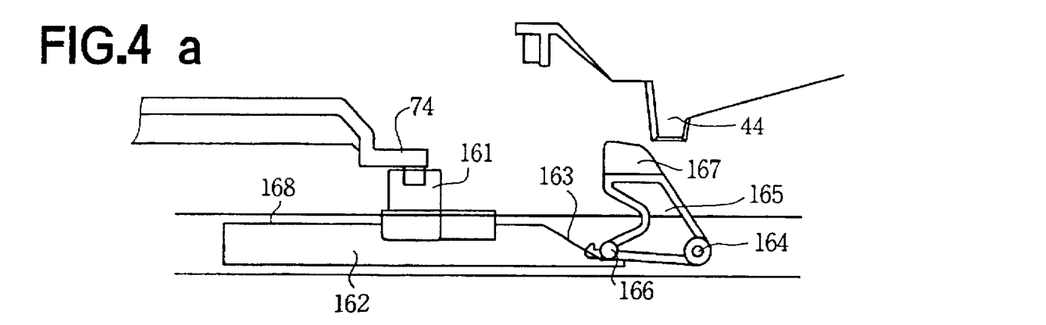
FIG. 4a–4d are explanatory views showing the operation of a locking mechanism provided within the improved recording medium changer of FIG. 1.

Referring to FIG. 4a, the locking mechanism 160 has a supporting member 161 which is connected with a slider 162 on one hand, and is connected with a driving plate 74 on the other. With the movement of the driving plate 74, the slider 162 will be moved back and forth with respect to the disc rack 40.

The front end of the slider 162 is formed into a cam portion 163. A locking arm 165 having an engaging pin 166 is provided to be pivotable about a shaft 164. Therefore, when the slider 162 is moved toward the locking arm 165, the engaging pin 166 becomes engaged with the cam portion 163 of the slider 162, so that the locking arm 165 is forced to pivot upwardly about the shaft 164, enabling a locking member 167 of the locking arm 165 to engage with a locking member 44 of the disc rack 40. As a result, the disc rack 40 may be locked and an undesired rotation thereof is sure to be prevented.

Namely, the locking mechanism 160 is usually in a state as shown in FIG. 4a. When a disc is to be selected, the disc rack 40 is rotated in a horizontal plane, so that a selected disc 200 or 201 comes to and stop at a position in front of the loading device 70.

After the rotation of the disc rack 40 is stopped, as illustrated in FIGS. 4b and 4c, the slider 162 is moved toward the disc rack 40. In this way, the engaging pin 166 becomes engaged with the cam portion 163 of the slider 162, so that the locking arm 165 is forced to pivot upwardly about the shaft 164, enabling a locking member 167 of the locking arm 165 to engage with a locking member 44 of the disc rack 40. As a result, as shown in FIG. 4d, the engaging pin 166 arrives at an upper portion 168 of the slider 162 and is stopped thereon. Accordingly, while a CD is being taken from the disc rack 40, the disc rack 40 may be locked and an undesired rotation (in horizontal plane) thereof is exactly prevented.

Figures 5A, 5B:
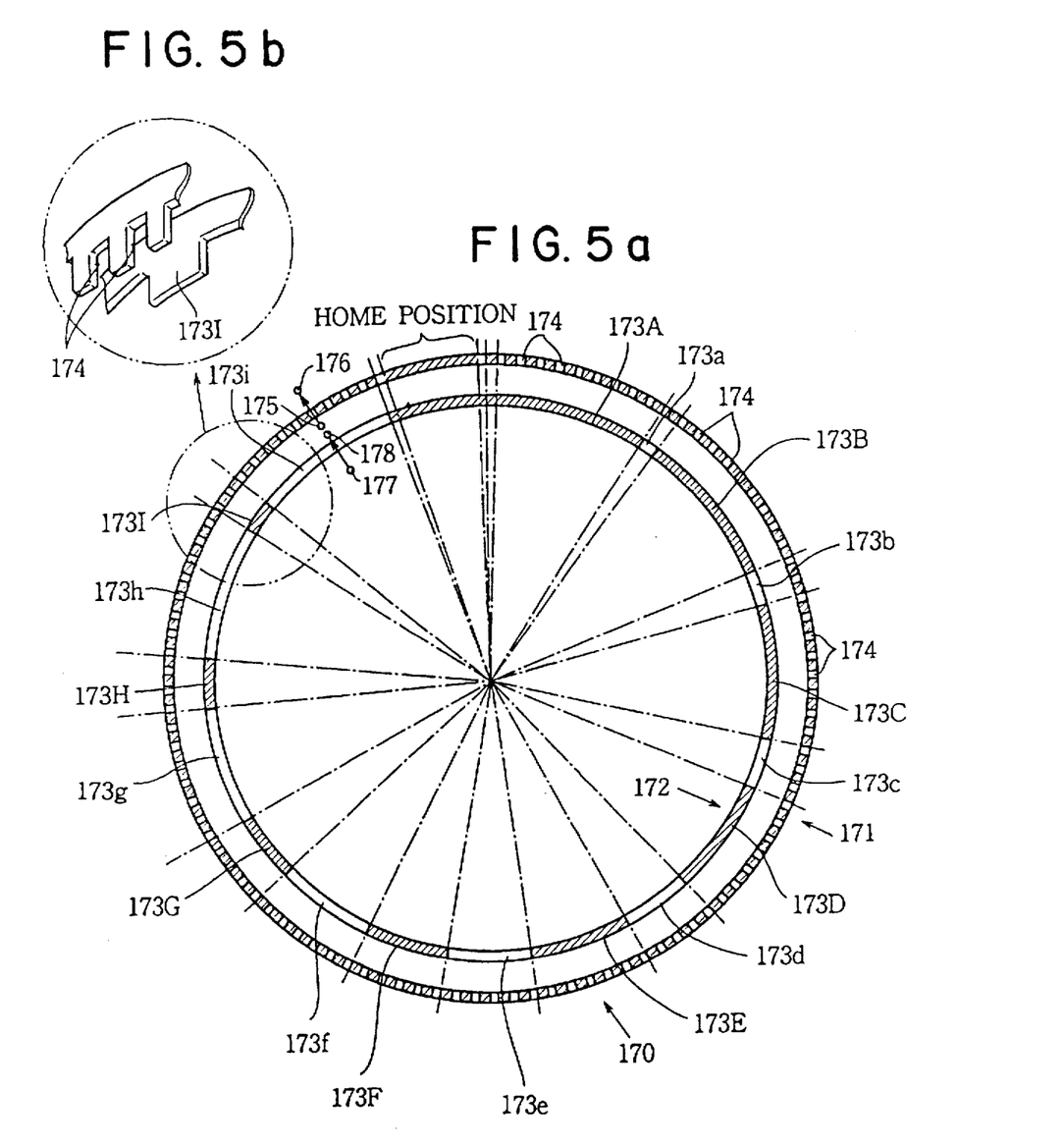
FIG. 5a–5b are cross sectional view showing a rotary encoder provided within the improved recording medium changer of FIG. 1.

FIG. 5a indicates a rotary encoder 170 provided on the bottom of the disc rack 40. As shown in FIG. 5a, the encoder 170 includes an outer annular detector 171 and an inner annular detector 172. Closing to the outer and inner annular detectors 171 and 172, are provided light emitters 175, 177 and light receivers 176, 178.

The outer annular detector 171 has many slits 174 corresponding to those formed on the disc rack 40. The inner annular detector 172 includes a number of light blocking plates 173A–173I, forming a number of slits 173a–173i with their sizes gradually increasing as shown in FIG. 5b. With the light detection (ON pulse) by the slits 173a–173i and the light detection (ON pulse) by the slits 174, the position of a CD 200 or a CD 201 within the disc rack 40 may be detected.

The operation of the CD changer 10 constructed as described above will be explained in detail as follows.

At first, when the fan-shaped door 60 is to be opened, a button (not shown) on the operating panel 110 is pushed so that the door driving system 120 operates to open the door 60.

Namely, the driving force of the motor 121 is transmitted from the pulley 122 through the belt 124 to the gear pulley 123. With the rotation of the two-stage gear 126 engaging with the gear portion of the gear pulley 123, the two-stage gear 127 rotates, so that a gear rack (not shown) formed along the lower portion of the door 60 is moved. In this way, the door 60 is turned about the shaft 61 in the opening direction, as shown in FIG. 2.

At this moment, since a detecting switch 131 is provided at a terminal position in the opening direction, the opening movement of the door 60 will turn on the switch 131 which will give a signal that the door 60 ha, been opened.

When the door 60 is stopped in the position near the rack driving system 140, the rack driving system 140 will be guarded from any possible touching by a hand through the opening 111 of the operating panel 110.

With the door 60 in its opened condition, a CD 200 or a CD 201 may be put into the receiving section 45 of the disc rack 40, or a CD may be taken out from the receiving section 45. After the operation of putting into or taking out a disc is finished, another button (not shown) on the operating panel 110 is pushed so that the door driving system 120 operates to close the door 60.

Similarly, since a detecting switch 130 is provided at a terminal position in the closing direction, the closing movement of the door 60 will turn on the switch 130 which will give a signal that the door 60 has been closed.

Afterwards, a third button (not shown) provided on the operating panel 110 is pushed to operate the disc rack driving system 140. Namely, the driving force of the motor 141 is transmitted from the pulley 142 through the belt 144 to the gear pulley 143. With the rotation of the intermediate gear 146 engaging with the small gear 145 (secured coaxially with the gear pulley 143), the twin gears 147 and 149 begin to rotate, enabling the rotation of the gears 148 and 150, thus causing the disc rack 40 to rotate in the clockwise or counterclockwise direction.

Meanwhile, the position of a CD 200 or a CD 201 within the disc rack 40 may be detected by the encoder 170. After the position of a selected CD 200 or a CD 201 has been detected, the the rotation of the disc rack 40 is stopped such that the selected CD arrives at a position in front of the loading device 70.

Then, as shown in FIGS. 4b and 4c, the slider 162 is moved toward the disc rack 40. In this way, the engaging pin 166 becomes engaged with the cam portion 163 of the slider 162, so that the locking arm 165 is forced to pivot upwardly about the shaft 164, enabling a locking member 167 of the locking arm 165 to engage with a locking member 44 of the disc rack 40. As a result, as shown in FIG. 4d, the engaging pin 166 arrives at the upper portion 168 of the slider 162 and is stopped there. In this way, the disc rack 44 may be locked and an undesired rotation thereof is sure to be prevented.

Subsequently, as shown in FIG. 3, the arm 73 in vertical position is caused to pivot in the clockwise direction until it engages with the out periphery of the CD 200 or the CD 201, and the arm 72 in horizontal position is caused to pivot in the counterclockwise direction unit it engages with the outer periphery of the CD.

With its outer periphery being clamped by two arms 72 and 73, the CD 200 or the CD 201 is then moved into a loading device main body 71 by counterclockwise pivoting movement of the two arms. Then, the CD 200 or the CD 201 is mounted on a turn table inside the main body 71 so as to be under a reproduceable condition. Afterwards, the arms 72 and 73 are caused to move away a little from the CD so as not to impede the rotation of the CD during its reproduction.

On the other hand, when the CD 200 or the CD 201 is to be ejected from the loading device main body 71, the CD is also clamped by two arms 72 and 73. Then, in a process opposite to that described above, the CD 200 or the CD 201 is moved back to the receiving section 45 of the disc rack 40.

Next, the slider 162 is caused to move back from the disc rack 40, so as to release the engagement between the locking member 167 and the locking member 44.

In this way, the disc rack 40 changes to its original turnable state.

Figure 6:
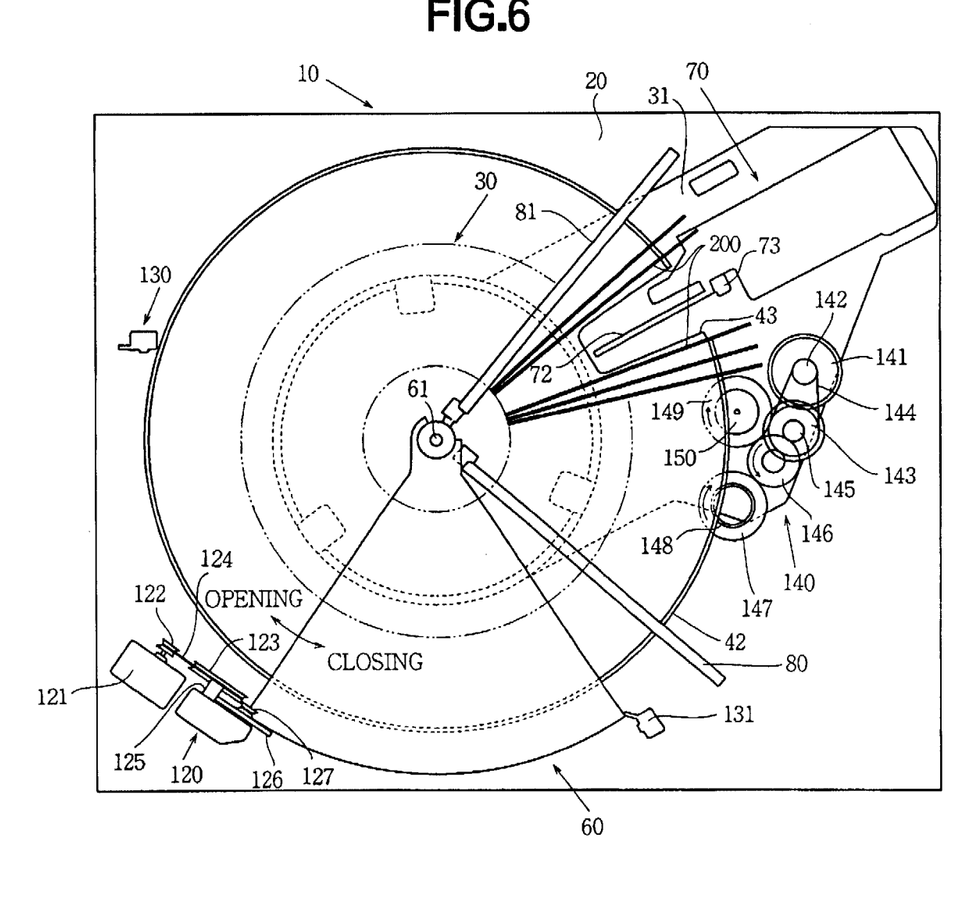
FIG. 6 is a plane view showing a modification of the improved recording medium changer of FIG. 1.

FIG. 6 shows another condition according to the present invention, where the fan-shaped door 60 is turned in the clockwise direction to be opened, and is turned in the counterclockwise direction to be closed.

As can be understood in the above description, since the door 60 is adapted to open and close with its outer periphery moving along the outer periphery of the disc rack 40, it does not need any additional space during its opening or closing. Thus, it is allowed to place other things in front of or above the CD reproducing device, thereby increasing a usable space nearby.

Also, since the door 60 in its opened condition does not project into a space in front of or above the CD reproducing device, it is sure to avoid any possible collision between a CD and the door 60, thereby avoiding a possibility that the CD is wounded when it is being put into or taken out from the CD changer.

Further, when the door 60 is in its opened position, the rack driving system 140 will be guarded from any possible touching by a hand through the opening 111 of the operating panel 110.

In addition, the construction of the CD changer of the present invention as described above may also be applied to a CD player capable of loading and reproducing a single disc.

Moreover, the basic principle of the CD changer of the present invention as described above may further be applied to a cassette tape reproducing device.

While the presently preferred embodiments of the this invention have been shown and described above, it is to be understood that these disclosures are for the purpose of illustration and that various changes and modifications may be made without departing form the scope of the invention as set forth in the appended claims.

What is claimed is:

1. A recording medium reproducing device, comprising:

a casing;

a reproducing section provided within the casing;

a recording medium changer provided adjacent to the reproducing section within the casing, wherein said recording medium changer has a receiving section rotatable about a center shaft and adapted to receive a plurality of recording media; and a door provided at an opening of the recording medium changer for a recording medium to be put into or taken out from the receiving section, said door being constructed such that when the door is opened or closed, the door turns about an axis which is coaxial with the center shaft of the receiving section.

2. The recording medium reproducing device according to claim 1, wherein the door is provided such that when the door is opened, the door will be in a position between the opening of the recording medium changer and internal elements provided within the recording medium changer.

3. The recording medium reproducing device according to claim 1, wherein the door is of a generally fan-shaped form, covering a part of the receiving section.

4. The recording medium reproducing device according to claim 1, wherein when the door is being opened or closed, the door turns about its shaft with its outer periphery moving along an arc trace which is almost coincident with the outer periphery of the receiving section.

5. The recording medium reproducing device according to claim 1, wherein the door is turnable about its shaft for about 65°.

6. The recording medium reproducing device according to claim 1, wherein a detector is provided at a terminal position in the opening direction of the door, to detect whether the door has been completely opened.

7. The recording medium reproducing device according to claim 1, wherein a detector is provided at a terminal position in the closing direction of the door, to detect whether the door has been completely closed.

8. The recording medium reproducing device according to claim 1, wherein the receiving section is provided to be freely rotatable for 360° and to be fixable by a locking mechanism.

* * * * *